United States Patent [19]

Siebert

[11] Patent Number: 5,289,314

[45] Date of Patent: Feb. 22, 1994

[54] COATINGS FOR LASER DETECTOR ETALONS

[75] Inventor: Edward T. Siebert, New Fairfield, Conn.

[73] Assignee: Hughes Aircraft Company, Los Angeles, Calif.

[21] Appl. No.: 857,345

[22] Filed: Mar. 25, 1992

[51] Int. Cl.⁵ .................... G02B 5/28; G01B 9/02; G01J 1/20

[52] U.S. Cl. .................... 359/586; 359/580; 359/589; 359/615; 359/577; 250/201.9; 356/352

[58] Field of Search ............ 356/352; 250/201.9; 359/580, 582, 586, 587, 589, 615, 577

[56] References Cited

U.S. PATENT DOCUMENTS

| | | | |
|---|---|---|---|
| 3,824,018 | 7/1974 | Crane, Jr. ........................ | 356/352 |
| 4,170,416 | 10/1979 | Fencil ............................ | 356/346 |
| 4,377,324 | 3/1983 | Durand et al. .................. | 359/589 |
| 4,536,089 | 8/1985 | Siebert .......................... | 356/352 |
| 4,545,646 | 10/1985 | Chern et al. ................... | 359/569 |
| 4,583,822 | 4/1986 | Southwell ...................... | 359/586 |
| 4,609,822 | 9/1986 | Roche ........................... | 250/352 |
| 4,819,239 | 4/1989 | Sharp et al. ................... | 372/12 |
| 4,952,025 | 8/1990 | Gunning, III ................. | 359/586 |
| 4,958,892 | 9/1990 | Jannson et al. ................ | 359/580 |
| 5,151,585 | 9/1992 | Siebert .......................... | 356/352 |
| 5,153,670 | 10/1992 | Jannson et al. ................ | 359/15 |

FOREIGN PATENT DOCUMENTS 0416251 3/1991 European Pat. Off. .
0454409 10/1991 European Pat. Off. .

OTHER PUBLICATIONS

"Spectral response calculations of rugate filters using coupled wave theory", by W. H. Southwell, Journal of Optical Society of America, vol. 5(9), 1558-1564 (Sep. 1988).

Primary Examiner—Bruce Y. Arnold
Assistant Examiner—David R. Parsons
Attorney, Agent, or Firm—Michael W. Sales; Wanda K. Denson-Low

[57] ABSTRACT

This invention provides embodiments of etalons (10, 14, 18, 22) that eliminate or minimize a falloff of relative radiation modulation as a function of wavelength or FOV. A first embodiment employs a dispersive coating, such as a rugate (12a, 12b, 16), to correct for the phase shift across an etalon step. A second embodiment employs a dispersive coating, such as a rugate (20a, 20b, 24), that provides a stepless etalon in which the phase shifts are generated by the coating. It is shown that in a rugate the phase shift on reflection is directly related to the phase of a sinusoidal index of refraction profile within the rugate, while the frequency of the sinusoidal index of refraction profile determines the wavelength at which the phase shift occurs. By changing the phase of the sinusoidal index of refraction variation as the period of the sinusoidal index of refraction variation is changed, a phase shift of incident radiation is produced that is a function of the wavelength of the incident radiation.

8 Claims, 4 Drawing Sheets

RUGATES FOR SPECTRAL BANDS

FIG. 5a. RUGATE FOR SINGLE WAVELENGTH
$M = M_0 + M_1 \sin(Kx + \phi)$

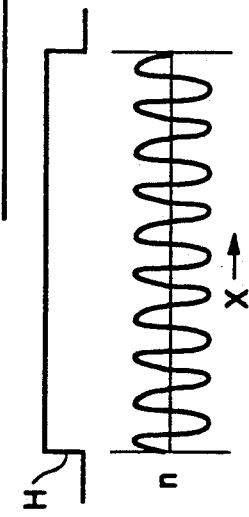

FIG. 5b. RUGATE FOR BAND OF WAVELENGTHS
$n(x) = n_0 [1 + \int H(n_1 K(x-x_0)/n_0 u(K) \sin(Kx + \phi(K)) dK/K]$,
$\approx n(x) = n_0 + n_1 (\Delta K / \overline{K}) \sin(Kx + \phi) \operatorname{sinc}[(x + \phi') \Delta K / 2)]$

FOR SMALL DISPERSION

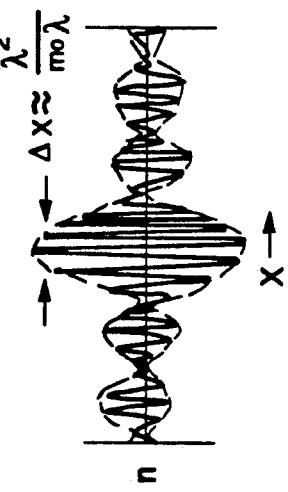

$\Delta x \approx \dfrac{\lambda^2}{m_0 \lambda}$

FIG. 5c. RUGATE TRUNCATED AT NULLS OF ENVELOPE

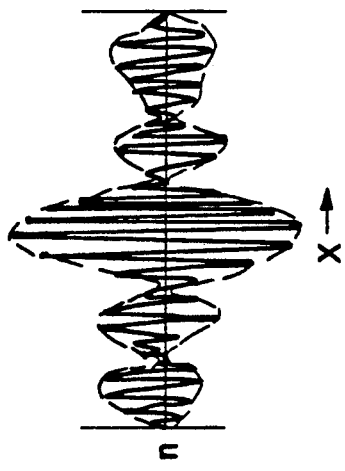

COATINGS FOR LASER DETECTOR ETALONS

CROSS REFERENCE TO RELATED PATENT APPLICATIONS

This patent application is related to commonly assigned U.S. patent application Ser. No. 07/857,001, filed Mar. 25, 1992, entitled "Dispersive Rugate Coatings", by E. T. Siebert and to commonly assigned U.S. patent application Ser. No. 07/857,367, filed Mar. 25, 1992, entitled "Etalons with Dispersive Coatings", by E. T. Siebert.

FIELD OF THE INVENTION

This invention relates generally to optical devices and, in particular, to optical coatings for etalons.

BACKGROUND OF THE INVENTION

The use of etalons for analyzers and/or detectors of coherent radiation is known in the art. As an example, U.S. Pat. No. 4,536,089, entitled "Analyzer for Coherent Radiation", (Aug. 20, 1985) to E. T. Siebert, shows in FIG. 4, a multi-stepped etalon for use with a plurality of radiation detectors coupled to a plurality of detector channels. Reference is also made, by example, to U.S. Pat. No. 4,170,416, entitled "Apparatus for Analyzing Coherent Radiation", (Oct. 9, 1979) to C. R. Fencil. This patent shows a Fabry-Perot interferometer or etalon that comprises a flat glass spacer having partially reflecting, stepped surfaces. The disclosure of each of these two U.S. Patents is incorporated by reference herein in their entireties.

U.S. Pat. No. 3,824,018, (Jul. 16, 1974) to Robert Crane Jr., entitled "Coherent Light Source Detector" is also of interest.

As employed herein, the term "etalon" is intended to encompass an optical device or element having two partially reflecting surfaces that are parallel to each other to optical tolerances. The space between the two reflecting coatings can be air or an optical material, and can be thick or thin. The thicker the spacer, the higher the resolution of the etalon. FIG. 1a shows a "solid" etalon where the spacer is a thick optical material. When the spacer is solid and thin, the etalon assumes the form of an interference filter.

Referring to FIG. 1a, known etalon laser detectors employ an etalon 1 having physical steps (a-d) to generate a phase shift for radiation passing through the etalon. The phase shift across a particular step is given by:

$$\beta = 2ks;$$

$$k = 2\pi n \cos \theta' / \lambda \quad (1)$$

where s=step height; n=index; $\theta'$=internal angle; and $\lambda$=wavelength.

At midband, $\beta$ is nominally $\pi/2$ or 90°, which is an optimum value. However, as the wavelength (or angle) changes, the phase moves off of optimum and the modulation (or signal across a step), going as $\sin \beta$, decreases. The same is true of the quadrature phase shift. If this falloff becomes significantly large, proper identification of coherent sources ceases and detection "holes" appear at the bandedges or the field-of-view (FOV) edges.

Known conventional coated laser detection etalons exhibit this undesirable degradation at the bandedges. The degradation is a result of (a) phase changes across the etalon steps, (b) phase changes between in-phase and quadrature channels, which is also due to phase changes across an etalon step, and (c) phase changes due to the FOV.

For conventional coatings the typical falloff of modulation with wavelength/FOV is shown in FIG. 1b. This falloff is a significant contributor to the generation of (a) detection holes in the field of view, (b) limited spectral coverage, (c) and a requirement for additional detector channels, which adds cost and complexity to the laser detection system.

It is thus one object of the invention to provide improved coatings for laser detection etalons that eliminate or minimize the undesirable degradation at the band edges due to the aforementioned phase changes at the etalon steps.

SUMMARY OF THE INVENTION

The foregoing and other problems are overcome and the object of the invention is realized by embodiments of etalons that eliminate or minimize a falloff of relative modulation as a function of wavelength or FOV. A first embodiment employs a dispersive coating to correct for the phase shift across an etalon step. A second embodiment employs a dispersive coating that provides a stepless etalon in which the phase shifts are generated by the coating.

In addition, the invention teaches two methods of designing the etalon coatings. A first method employs a rugate coating technology in which the phase of the rugate is controlled to provide the desired result. A second method employs an iterative coating design technique in which a coating having the desired properties is generated by successive approximations using a nominal starting point and standard coating optimization routines.

The invention extends the use of a rugate coating to provide a change in phase with wavelength. That is, the phase is made dispersive. An important factor in designing such a dispersive rugate coating is shown to be a realization that in a rugate the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a graph illustrating a fall-off in relative modulation as a function of wavelength or FOV for the conventional etalon of FIG. 1a;

FIG. 5a illustrates a rugate for use with a single wavelength;

FIG. 5b illustrates a rugate for use with a band of wavelengths;

FIG. 5c illustrates a rugate truncated at nulls of an envelope; and

DETAILED DESCRIPTION OF THE INVENTION

Reference is made to an article entitled "Spectral Response Calculations of Rugate Filters Using Coupled-wave Theory", by W. H. Southwell, Journal of the Optical Society of America, Vol. 5(9), 1558–1564(1988). This article discusses gradient-index interference filter coatings having an index of refraction that varies in a sinusoidal fashion in a direction normal to a substrate. A narrow bandwidth reflector is shown to be achieved with a rugate coating, the bandwidth being proportional to the fractional index change.

Figure 5D:
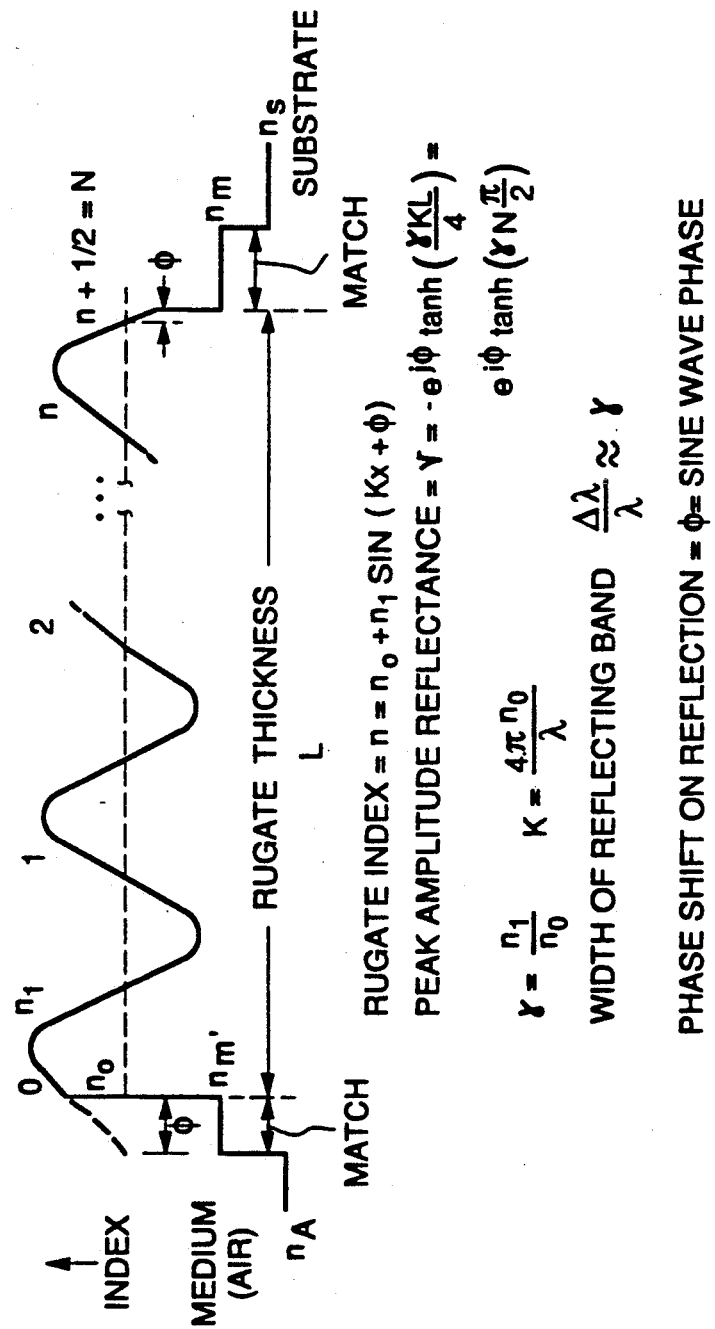
FIG. 5d is a graph illustrating an index of refraction profile for a rugate as a function of thickness.

In FIG. 5d there is shown an exemplary rugate index of refraction profile. In FIG. 5d, the substrate is on the right, light is incident from the left, $n_s$ is the index of refraction of the substrate, $n_A$ is the index of refraction of the incident medium, typically air, $n_o$ is the average index of refraction through the rugate, and $n_1$ is the peak index of refraction variation, which is typically small compared with $n_o$. Phi ($\phi$) is the starting or initial phase of the index of refraction variation.

The word rugate, when used as a noun, is herein intended to define a gradient-index interference filter whose index of refraction profile is a sine wave. When used as an adjective, the word rugate is herein taken to describe the sine-wave index of refraction profile of a coating.

The invention extends the use of a rugate coating to provide a change in phase with wavelength. That is, the phase is made dispersive. An important factor in designing such a dispersive rugate coating is a realization that in a rugate the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation. That is, the phase shift is made dispersive.

For a single wavelength and normal incidence a rugate has an index of refraction (index) profile of:

$$n(x) = n_o + n_1 \sin(Kx + \phi),$$

$$K = 4\pi n_o/\lambda, \quad (2)$$

where $n_o$ is an average index, $n_1$ is a peak index variation, K determines a wavelength $\lambda$ for which maximum reflection occurs, $\phi$ is a starting phase of the index variation, and x is a thickness within a range of ($0 \leq X \leq L$). The amplitude reflectivity (r) produced by this profile is:

$$r = \tanh(u/4) \exp(i\phi),$$

$$R = |r|^2 = \text{Intensity Reflectivity},$$

$$u = KLn_1/n_o = 2\pi N n_1/n_o, \quad (3)$$

where $\Delta\lambda/\lambda = n_1/n_o$ is a fractional bandwidth, where N is a number of cycles in the coating, normally half integer, and L is the physical thickness of the coating. It can be seen that the maximum reflectivity at $\lambda$ is determined by u which is the product of the fractional index variation times the number of cycles, while the phase shift on reflection is given by the phase shift of the index profile, $\phi$. The foregoing analysis provides a basis for a rugate design for use with a single wavelength, as depicted in FIG. 5a.

For multiple wavelengths which are widely separated ($\lambda_i - \lambda_j >> \Delta\lambda$), a rugate may be obtained for each wavelength by summing the index profiles:

$$n(x) = n_o + \Sigma n_i \sin(K_i x + \phi_i) H((n_i K(x - x_o))/(n_o u_i)) \quad (4)$$

as is shown in FIG. 5b. For a Southwell analysis, $H(t) = 1$ if $0 \leq X \leq 1$, otherwise $H = 0$. However, more generally H is an apodizing function chosen to minimize the reflection sidebands and also to have finite extent (the coating thickness). Possible forms of H are square waves (Southwell truncation), Fourier transform windowing functions (Hanning, Kaiser-Bessel, etc.) or other apodizing functions (e.g., truncated Gaussian or prolate spheroidal functions). It is within the scope of this invention to use these various apodizing functions for H.

To design a rugate over a continuous wavelength band, the sum of Eq. (4) is replaced by an integral:

$$n(x) = n_o[1 + \int H(n_i K(x-x_o)/n_o u(K)) \sin(Kx + \phi(K)) dK/K], \quad (5)$$

where $n_o$ is equal to the average index of refraction, $K = 4\pi n_o/\lambda$, and $\lambda$ is the wavelength, where $u(K) = -4\tanh^{-1}[R(K)]^{178}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apodizing function located at $x_o$ whose extent defines the region of index variation at the wavelength $\lambda$. In going to the integral, we have multiplied equation (4) by $dK/\Delta K$, where $\Delta K = n_i K/n_o$ is the width of the reflection band.

When N is constant and $\phi$ is constant or linear in K (that is, same reflectivity at all wavelengths and no dispersion), when $\Delta K$ is small compared to the average K, and when $H = 1$, the integral gives:

$$n(x) = n_o + n_1(\Delta K/K_1) \sin(\overline{K}x + \overline{00}/) \\ \text{sinc}[(x + \phi')(\Delta K/2)] \quad (6)$$

where $\phi'$ is the derivative of $\phi$ with respect to K (assumed to be constant or zero), and $\overline{K} \overline{00}/$ are the average values of K, $\phi$. This is similar to the aforedescribed case for a single wavelength, except that the sine wave is multiplied by an envelope (the sinc function) which nominally limits the large index extent to $\Delta x \approx 2\pi/\Delta K = \lambda^2/(2(n_o)\Delta\lambda)$. As the spectral bandwidth increases, the region wherein the index varies significantly becomes smaller. It is possible to truncate this envelope, which is technically larger than L, after N cycles as seen in FIG. 5c.

Even when $\phi$ is slightly dispersive, Eq. (6) remains approximately valid with $\phi$ replaced by $\phi(K)$, so that the same conclusions hold.

It is seen that the peak deviation of the index from $n_o$ occurs at sin $(\overline{K}x+\overline{100})=1$. If $H=1$ and sinc$=1$ (its maximum), then $n_p=n_1\Delta K/K_1=n_o\Delta K/K$. As the fractional bandwidth $\Delta K/K$ becomes large, then the peak index can become sufficiently large that it exceeds physical realizability. In this event, the sinc function must be kept less than unity. This can be accomplished by adding a prescribed dispersion to all the coatings. The actual coating phases are immaterial for laser detection etalons so long as their differences are controlled (FIG. 5), so equal phase dispersions can be added to each step. The phase dispersion can be chosen to either move the peak of the sinc function out of the coating (through $\phi'$) or to change the sinc function into another function having a smaller peak (e.g., a quadratic phase gives the differences of Si functions). Also, $\phi$ should be slowly varying enough, or $n_1$ should be chosen small enough so that $n_1K(d\phi/dK)<<\pi n_o$. A smaller $n_1$ increases the N required for a given reflectivity and the fabrication tolerances. It is within the scope of the invention to employ coatings with a phase dispersion chosen to limit the peak index required to a predetermined realizable value.

Based upon the foregoing, a technique for specifying a dispersive rugate coating over an extended spectral region is now provided. Using the desired dispersion and reflectivities for a given application Eq. (5) is used to determine a nominal coating design. The envelope may be truncated (usually at a zero of the sinc function) or apodized to limit it to a finite region. Coating thickness must be large enough to provide the fractional bandwidth and number of cycles required. The design may be iterated, if necessary, to eliminate truncation and end matching effects. It is also within the scope of the invention to convert the resulting graded index specification into a discrete multilayer embodiment, using standard techniques.

Fabrication is essentially unchanged from standard rugate (or multilayer) fabrication. For rugates, the following points should be noted. First, the coating starting point (at the substrate) may not be at $n_o$. However, truncation at a zero of the sinc function, or apodization, returns the starting point to zero. Second, the average frequency is essentially unchanged from the midband. Third, because a significant blocking region is generally desired around the etalon line, the rugate reflection band is relatively wide. This indicates that the rugate coating should be relatively thin, in that the bandwidth of the rugate decreases as the rugate thickness is increased. A relatively thin rugate coating relaxes fabrication control requirements and decreases stress build-up in the coating. Thus, standard coating fabrication techniques are applicable.

Figure 2A:
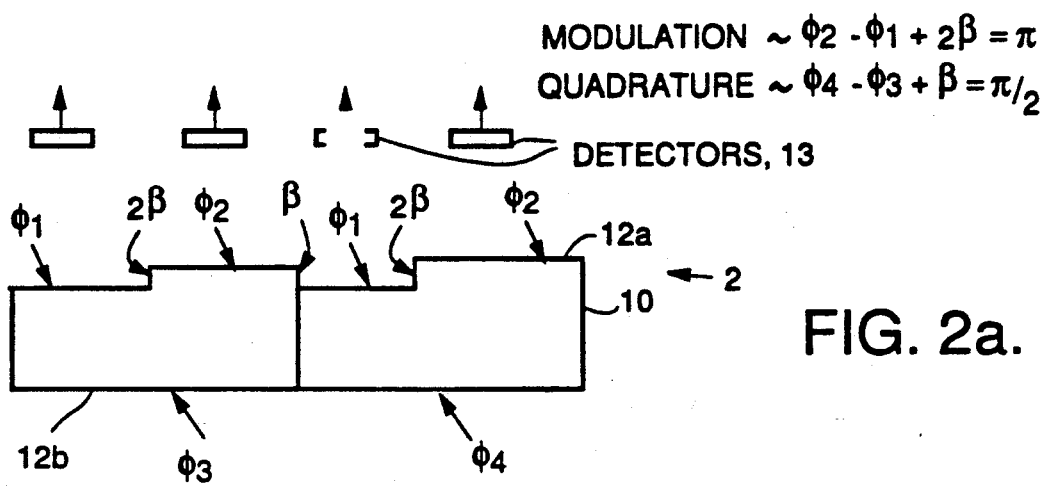
FIG. 2a shows a first embodiment of a stepped etalon.

In accordance with the invention, a first coating approach is to use $\phi$ to compensate for the variation in $\beta$. FIG. 2a shows an etalon 2 that includes a transparent substrate 10 having rugate coatings 12a and 12b that are applied to top and bottom major surfaces, respectively, and step heights of $\beta$ and $2\beta$, as shown. To compensate for the phase variation in $\beta$ there is selected:

$$\phi 1'-\phi 2'=2\beta'=2d\beta/dk=4(s+(k/n)(dn/dk)) \quad (7)$$

Any combination of $\phi$s that provides this result is permissible. Thus, one may select $\phi 2'=0$ and $\phi 1'=2\beta'$ or one may select $\phi 2'=-\phi 1'=\beta'$. Similar relationships hold for $\phi 3'$ and $\phi 4'$. It should be noted that both thickness and index dispersion are compensated for. In equation (7) the terms having a prime are a derivative with respect to k. A plurality of radiation detectors 13 are disposed relative to the etalon 2 for detecting coherent radiation, as in the above referenced U.S. Pat. No. 4,536,039, the subject matter of which has been incorporated by reference herein.

Figure 2B:
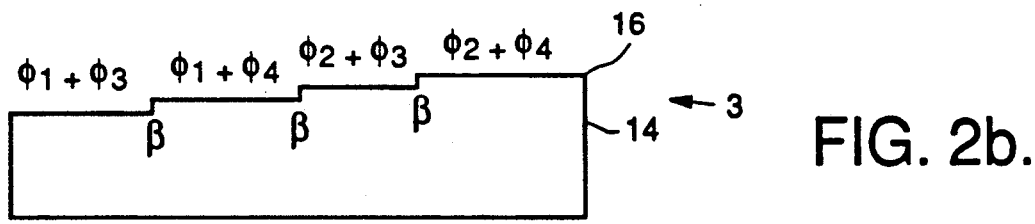
FIG. 2b shows a second embodiment of a stepped etalon.

FIG. 2b shows an etalon 3, having uniform step heights $\beta$, that includes a transparent substrate 14 having rugate coatings 16 applied only to a top major surface thereof, the rugate coatings 16 having the characteristics as shown.

Figure 3A:
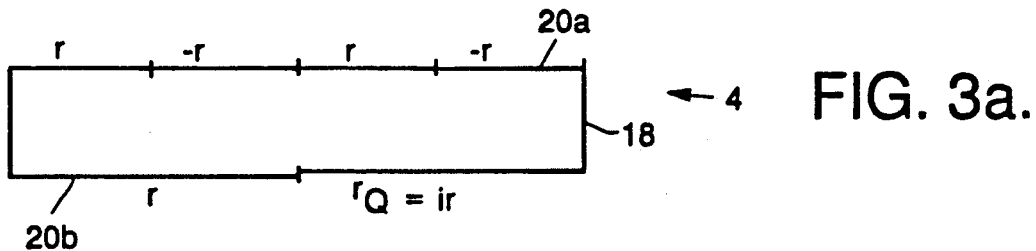
FIG. 3a shows a first embodiment of a stepless etalon.
Figure 3B:
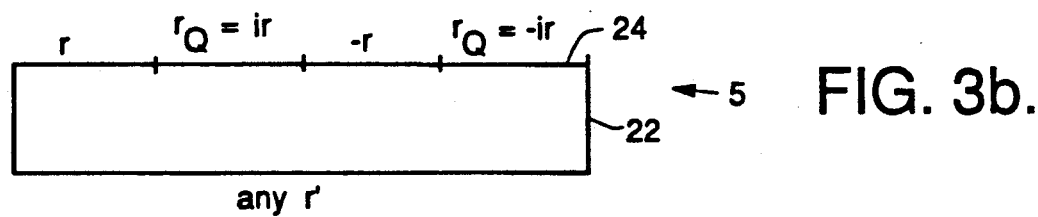
FIG. 3b shows a second embodiment of a stepless etalon.

FIGS. 3a and 3b show further embodiments of etalons 4 and 5, comprised of substrates 18 and 22, respectively, having rugate coatings 20a, 20b, and 24, respectively applied to one or more major surfaces thereof. These embodiments eliminate the etalon steps and employ the rugate coatings 20a, 20b, and 24 to generate the phase shifts. In this case, $\phi'$ is set equal to zero in Eq. (6), and $\phi$ is employed to determine the coating phase. It can be realized that if $\phi=0$ for the r coating, then $\phi=180°$ for the out-of-phase coating $(-r)$, $90°$ for the quadrature coating, and $270°$ for the negative quadrature coating. In FIG. 3b the term (i) is equal to the square root of minus one and is used to designate a $90°$ phase shift. In FIGS. 3a and 3b r and $-r$ give the phase shift $\phi$, and the goal is to provide two coatings with an invariant $180°$ phase shift.

Figure 1A:
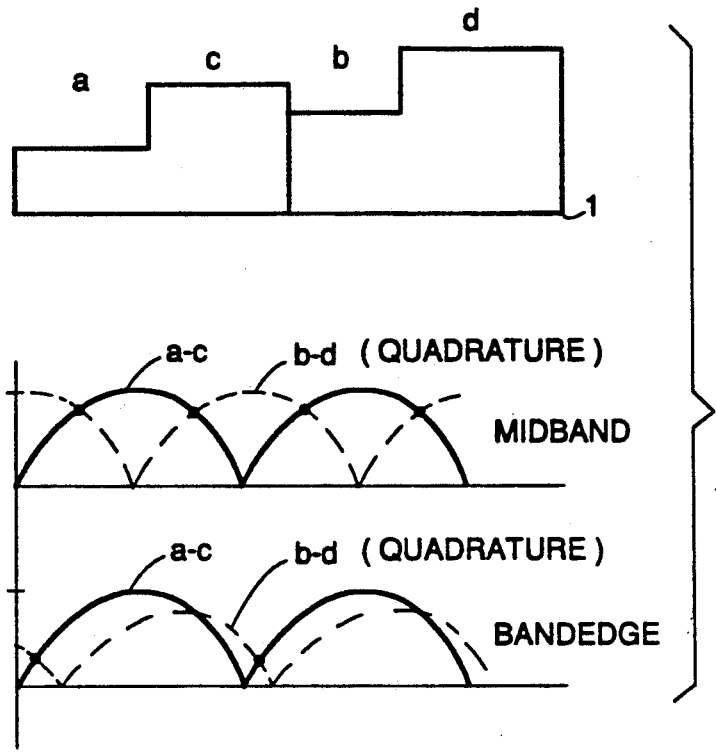
FIG. 1a illustrates in cross-section a conventional stepped etalon and the midband and bandedge transmission characteristics thereof.
Figure 1B:
Figure 4:
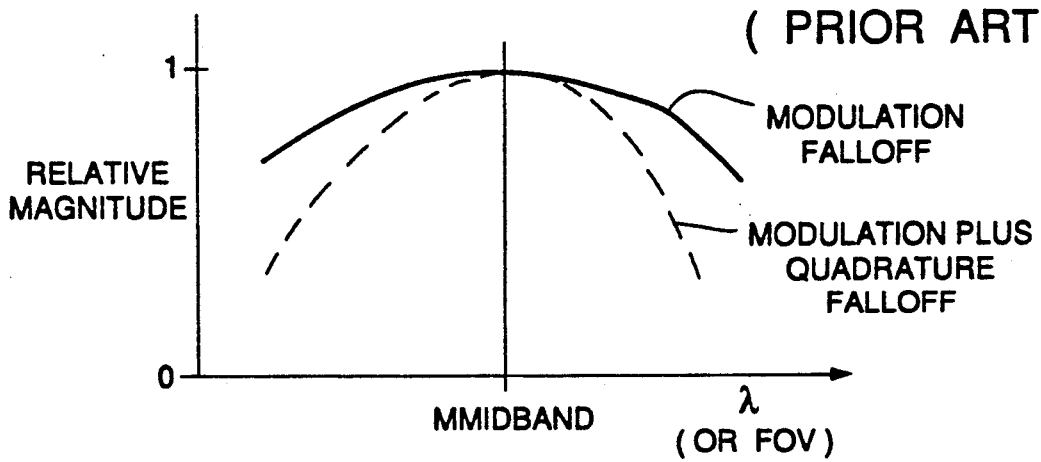
FIG. 4 is a graph illustrating an improvement in transmission characteristics for etalons of FIGS. 2 and 3.
Figure 4:
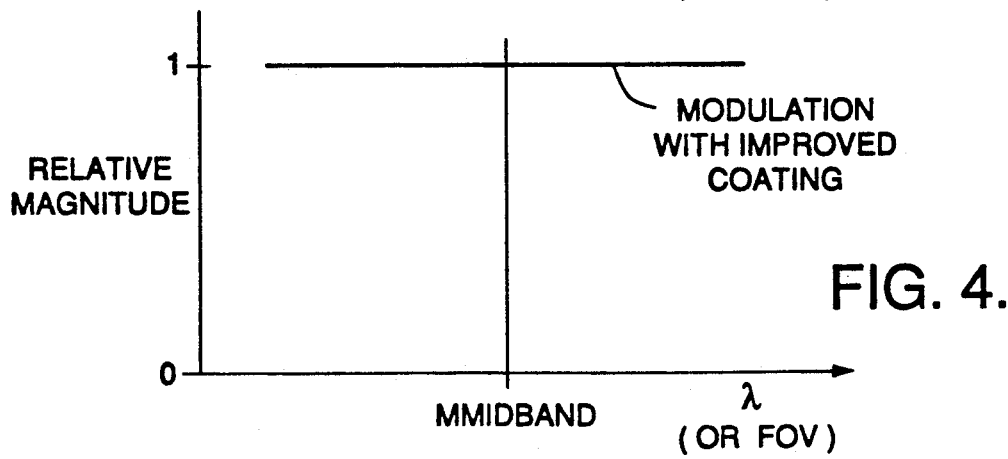

For either of the embodiments of FIGS. 2 and 3 radiation may be incident on the top or bottom surfaces and the result is the improved coating modulation characteristic shown in FIG. 4.

It is important to note that replacing conventional etalon coatings with the rugate coatings of the invention may be accomplished using current coating technology. In this regard the substrate for the etalons 10 and 12 may be comprised of glass, and the coating material may be comprised of, by example, $ThF_4$, $ZnSe$, $Si_xO_y$, and $TiO_2$, and of combinations thereof. A presently preferred method of coating deposition employs an evaporative technique wherein the substrate is placed in an evacuated chamber with selected coating source materials, and where the source materials are controllably evaporated and deposited upon a surface of the substrate so as to provide the graded index of refraction variation with depth, or a multi-layered approximation thereof.

The etalons of the invention may be employed, by example, as components of coherent radiation analyzers and detectors, of a type disclosed in the U.S. Patents that were incorporated by reference herein, to significantly improve the modulation characteristics thereof.

While the invention has been particularly shown and described with respect to a preferred embodiment thereof, it will be understood by those skilled in the art that changes in form and details may be made therein without departing from the scope and spirit of the invention.

What is claimed is:

1. An etalon for modulating a radiation signal, comprising:
   a substrate having a first major surface and a second, opposite major surface, the first major surface having at least one step therein; and
   a plurality of dispersive coatings formed upon at least one of said major surfaces of said substrate, said plurality of dispersive coatings each having a spatially varying index of refraction through a depth thereof, the profile being selected as a function of a height of said at least one step and for reducing a falloff in modulation of said etalon due to a phase shift for radiation at said at least one step;

wherein said plurality of dispersive coatings are rugate coatings having a spatially varying index of refraction profile n(x) that varies in accordance with a sinusoidal function, wherein n(x) is give by the expression:

$$n(x) = n_0(1 + \int H(n_i K(x-x_0)/n_0 u(K)) \sin(Kx + \phi(K)) dK/K)$$

where $n_o$ is equal to the average index of refraction, $K = 4\pi n_o/\lambda$, [$\phi'$ is the internal angle in the coating] and $\lambda$ is the wavelength, where $u(K) = 4\tanh^{-1}(R(K))^{\frac{1}{2}}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apodizing function located at $x_o$ whose extent defines the region of index variation at the wavelength $\lambda$.

2. An etalon as set forth in claim 1 wherein said plurality of dispersive coatings are formed as multi-layered coatings.

3. An etalon for modulating a radiation signal, comprising:

a substrate having a first major surface and a second, opposite major surface; and a plurality of dispersive coatings formed upon at least one of said major surfaces of said substrate, said plurality of dispersive coatings each having a spatially varying index of refraction profile through a depth thereof, the profile being selected for inducing a predetermined phase shift between two adjacent coatings;

wherein said plurality of dispersive coatings are rugate coatings having a spatially varying index of refraction profile n(x) that varies in accordance with a sinusoidal function, wherein n(x) is give by the expression:

$$n(x) = n_0(1 + \int H(n_i K(x-x_0)/n_0 u(K)) \sin(Kx + \phi(K)) dK/K)$$

where $n_o$ is equal to the average index of refraction, $K = 40\pi n_o/\lambda$, [$\phi'$ is the internal angle in the coating] and $\lambda$ is the wavelength, where $u(K) = 4\tanh^{-1}(R(K))^{178}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apodizing function located at $x_o$ whose extent defines the region of index at the wavelength $\lambda$.

4. An etalon as set forth in claim 3 wherein said plurality of dispersive coatings are formed as multi-layered coatings.

5. Apparatus for detecting coherent radiation, comprising:

an etalon disposed for receiving coherent radiation, said etalon including a substrate having a first major surface and a second, opposite major surface, the first major surface having at least one step therein;

a plurality of dispersive coatings formed upon at least one of said major surfaces of said substrate, said plurality of dispersive coatings each having a spatially varying index of refraction profile through a depth thereof, the profile being selected as a function of a height of said at least one step and for reducing a falloff in a modulation characteristic of said etalon due to a phase shift for coherent radiation at said at least one step; and detector means disposed relative to said etalon for detecting a presence of the coherent radiation;

wherein said plurality of dispersive coatings are rugate coatings having a spatially varying index of refraction profile n(x) that varies in accordance with a sinusoidal function, wherein n(x) is give by the expression:

$$n(x) = n_0(1 + \int H(n_i K(x-x_0)/n_0 u(K)) \sin(Kx + \phi(K)) dK/K)$$

where $n_o$ is equal to the average index of refraction, $K = 4\pi n_o/\lambda$, [$\phi'$ is the internal angle in the coating ] and $\lambda$ is the wavelength, where $u(K) = 4\tanh^{-1}(R(K))^{178}$ is a number of cycles in the coating to achieve a desired reflectivity $R(K)$, $n_1$ is the peak deviation of the index from $n_o$ for a single wavelength, where $\phi(K)$ is the phase of reflected light as a function of K, where x is a distance into the coating, and where H is an envelope or apodizing function located at $x_o$ whose extent defines the region of index variation at the wavelength $\lambda$.

6. Apparatus as set forth in claim 5 wherein said plurality of dispersive coatings are formed as multi-layered coatings.

7. Apparatus for detecting coherent radiation, comprising:

an etalon disposed for receiving coherent radiation, said etalon including a substrate having a first major surface and a second, opposite major surface;

a plurality of dispersive coatings formed upon at least one of said major surfaces of said substrate, said plurality of dispersive coatings each having a spatially varying index of refraction profile through a depth thereof, the profile being selected for inducing a predetermined phase shift in the coherent radiation between two adjacent coatings; and detector means disposed relative to said etalon for detecting a presence of the coherent radiation;

wherein said plurality of dispersive coatings are rugate coatings having a spatially varying index of refraction profile n(x) that varies in accordance with a sinusoidal function, wherein n(x) is give by the expression:

$$n(x) = n_0(1 + \int H(n_i K(x-x_0)/n_0 u(K)) \sin(Kx + \phi(K)) dK/K)$$

where $n_o$ is equal to the average index of refraction, $K = 4\pi n_o/\lambda$, [$\phi'$ is the internal angle in the coating] and $\lambda$ is the wavelength, where $u(K) = 4\tanh^{-1}(R(K))^{178}$ is a number of cycles in the coating to achieve a desired reflectivity $R(K)$, $n_1$ is the peak deviation of the index from $n_o$ for a single wavelength, where $\phi(K)$ is the phase of reflected light as function of K, where x is a distance into the coating, and where H is an envelope or apodizing function located at $x_o$ whose extent defines the region of index variation at the wavelength $\lambda$.

8. Apparatus as set forth in claim 7 wherein said plurality of dispersive coatings are formed as multi-layered coatings.

* * * * *